March 28, 1967 W. L. SHEPPARD 3,310,959
UNIVERSAL JOINT
Filed March 29, 1965
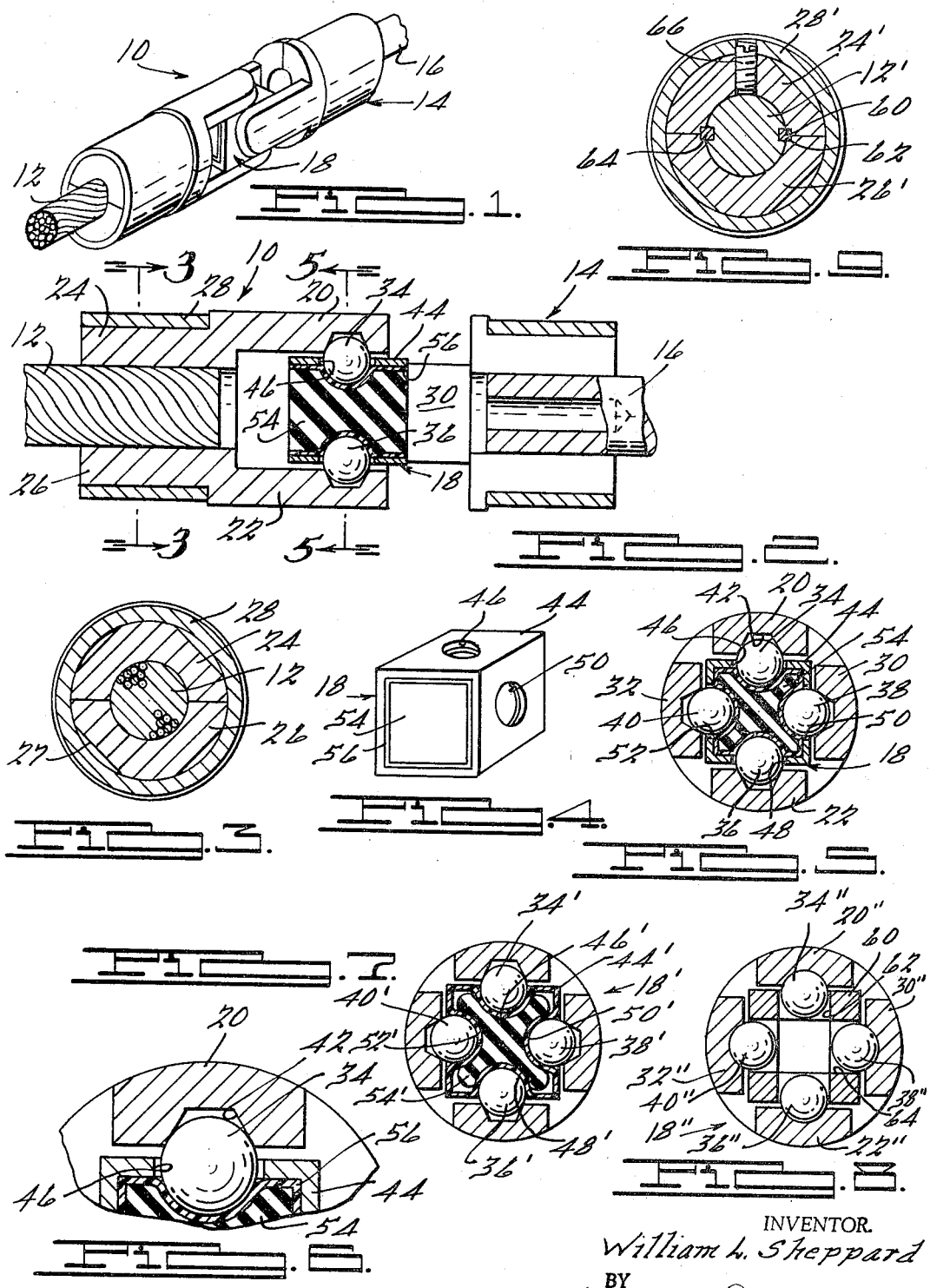
INVENTOR.
William L. Sheppard
BY
Harness, Dickey & Pierce
ATTORNEYS.

United States Patent Office 3,310,959
Patented Mar. 28, 1967

3,310,959
UNIVERSAL JOINT
William L. Sheppard, Romulus, Mich., assignor of one-half to Edwin J. Lukas, Dearborn, Mich.
Filed Mar. 29, 1965, Ser. No. 443,573
18 Claims. (Cl. 64—17)

This invention relates to universal joints.

While the principles of the present invention are applicable to universal joints of a substantial range of sizes, to universal joints whether the amount of inherent backlash is not significant and to continuous-power transmitting universal joints functioning as elements of running torque-transmission trains, those principles were originally developed as an element of the creation of a small, low-cost universal joint for use in a relatively low-torque reversible remote control system in which rotational movement of a controlling element is communicated to a rotatable, remote, controlled device, preferably with a minimum of backlash for precision of adjustment.

In general, in the universal joint disclosed herein, torque from one shaft is communicated to another via a torque-transmission path comprising one torque transmitting member, connected to one shaft and illustratively in the form of a yoke, a first pair of aligned balls driven by the yoke, a coupling element, and a second pair of balls aligned along an axis perpendicular to (but not necessarily intersecting) that of the first pair of balls, and a second torque transmitting member connected to the second pair of balls and to the other shaft. In a broad sense, the coupling element may take the form of a rigid member transmitting torque from one pair of balls to the other, with means being provided to establish and maintain the balls in proper driving relationship. However, in the presently preferred arrangement, the coupling element comprises a preloaded elastomeric member, with torque being communicated from one pair of balls to the other solely or primarily through the elastomeric member.

The nature of the invention, and its objects and features, may be fully perceived from the following detailed description of illustrative embodiments of the invention when read with reference to the accompanying drawings in which:

FIG. 1 is a perspective view of a universal joint embodying certain of the principles of the present invention;

FIG. 2 is a longitudinal section of a universal joint similar to that of FIG. 1;

FIG. 3 is a section taken substantially along the line 3—3 of FIG. 2;

FIG. 4 is a perspective view of the coupling element employed in the structure of FIG. 2;

FIG. 5 is a section taken substantially along the line 5—5 of FIG. 2;

FIG. 6 is an enlarged fragmentary view of a portion of FIG. 5;

FIG. 7 is a cross sectional view of a modified coupling element;

FIG. 8 is a cross sectional view of another modified coupling element; and

FIG. 9 is a cross sectional view of a modified construction.

The universal joint generally illustrated in FIG. 1 includes a first torque transmitting member 10 secured to a shaft (driving or driven) 12, a second torque transmitting member 14 connected to another (driven or driving) shaft 16, and a coupling element 18 establishing a torque transmitting connection between members 10 and 14.

As may best be seen in FIGS. 2–6, torque transmitting member 10 preferably is in the form of a yoke, having two arms 20 and 22 disposed in spaced parallelism with one another. In the illustrated construction, member 10 is formed in two halves, arms 20 and 22 terminating in generally semi-annular body sections 24 and 26, respectively. These sections are clamped together and onto the shaft 12 by a ring 28 which is preferably press fitted in position. The ring may be, for example, of steel and the torque transmitting members may be machined, formed of powdered iron, cast, or otherwise formed.

The longitudinal aperture defined by body sections 24 and 26 should preferably be made smaller than the diameter of the shaft to establish a secure driving relationship. Rigid shafts may be drilled from the end to create a tubular end section to insure tight engagement while yet preventing the shaft from holding the two body sections apart at the joint therebetween.

If it is not feasible to hold the thickness tolerances of the body sections sufficiently close, as it may not be as in die casting, the resultant elliptical form of the exterior surface of the mated body sections can make it difficult to assemble the clamping ring thereto and may result in overstressing of that ring. To alleviate that problem, it is preferred that the exterior surfaces of the body sections be provided with one or more relieved areas or flats as at 27 in FIG. 3. These flats reduce the circumferential length of the assembled body sections and permit the annular clamping ring to be distorted to establish proper clamping action without overtensioning the ring material.

The other member 14 may, similarly, have projecting arm portions 30 and 32 and may be correspondingly secured to its shaft 16.

Torque is transmitted between members 10 and 14 by means including balls 34, 36, 38 and 40 individual to arms 20, 22, 30 and 32, respectively. These balls serve as projecting elements and may be formed integrally with the members 10 and 14, as by being in the form of projecting cylindrical, spherical or conical members. However, hardened steel balls work well, are cheap, and are preferred. It is necessary to establish a torque transmitting relationship between the arms 20, 22, 30 and 32 and their respective balls. This may be accomplished by forming sockets in the inner faces of the arm portions to accept the balls. It has been found to be advantageous to form the sockets in a generally frusto-conical form, as illustrated at socket 42 in arm portion 20 in FIG. 6, since, as will be seen, forces are or may be exerted tending to drive the balls towards their individual arm portions, and the tapering socket configuration enables this force to establish a firm relationship between the ball and socket to effectively eliminate backlash at this connection. While this is of significance if relative rotation is to exist between the ball and its associated socket in the arm portion, it is now preferred to fix the balls against that relative rotation and the balls are preferably secured to their individual arm portions such as by a suitable adhesive.

The four balls 34, 36, 38 and 40 are seated or located in individual sockets formed in a cage 44 constituting a part of the coupling element 18. In the preferred arrangement, cage 44 is a hollow, tubular sleeve representatively of square cross section. It can be made of metal, with its wall thickness being less, and desirably substantially less, than the diameter of the balls. Two ball-accepting sockets 46 and 48 are formed on opposite faces of cage 44 preferably in alignment with one another along an axis extending perpendicularly to and intersecting the longitudinal axis of the cage 44. Each is preferably centered, transversely, on the face of the cage. Another pair of ball-accepting sockets 50 and 52 are similarly formed in cage 44 in alignment along an axis extending perpendicularly to the axis of alignment of sockets 46 and 48. All four sockets may have their centers in a common plane, as illustrated, or one pair thereof may be spaced longitudinally of the cage from the other pair. In the joint illustrated in FIGS. 1-6, sockets 46, 48, 50 and 52 are in the form of circular apertures extending through the side wall of cage 44.

An elastomeric member 54 is disposed within cage 44. An elastomeric material or member is, for purposes hereof, an elastic, rubber-like substance such as natural or synthetic rubber having the characteristic that it is substantially or in practical effect incompressible if restrained against change of shape. In a constructed arrangement member 54 was rubber, was of square cross section, and was of a size to freely, but not loosely, slip within cage 44 during assembly. In that arrangement, the rubber was reasonably hard, of approximately 60 durometer. Improved operation has been achieved by surfacing the elastomeric member 54 with a material having a low coefficient of friction. In a constructed arrangement, a sleeve 56 formed of Teflon film was placed around member 54 before insertion thereof in cage 44. The film need only be strong enough to remain intact under the applied stresses.

With the joint assembled, the balls 34, 36, 38 and 40 are forced, by arm portions 20, 22, 30 and 32 into the surface of the sleeved-covered member 54 to apply substantial compressive forces thereto which are directed essentially towards the longitudinal axis thereof and which may therefore be viewed as radial compressive forces. Since member 54 is radially (transversely in all directions) confined or constrained, the material thereof can deform but longitudinally. Accordingly, while member 54 is resilient and exerts a resilient force against the balls in an outward direction, it is substantially preloaded and will resist any effort to deform any of its increments from the illustrated position.

If desired, member 54 may be employed primarily as a resilient means for forcing the balls outwardly, and in that case the ball-accepting apertures in cage 44 may be of substantially the same diameter as the balls. In that event, torque applied to one of the shafts, such as flexible shaft 12, is communicated to member 10, through balls 34 and 36, to apply a moment to the walls of apertures 46 and 48 of cage 44, via that cage to balls 38 and 40 and hence to member 14 and shaft 16. The smaller the clearance between the walls of the sockets and the individual balls, the less the backlash. In this mode of use, the cage 44 should be hardened to reduce the rate of wear.

In the preferred construction, the member 54 is an element of the torque transmission train. To this end, the apertures, such as aperture 46, in cage 44 are made slightly larger than the diameter of the balls. The application of a moment to one pair of balls results in the application of a moment to the preloaded elastomeric member which communicates that moment to the other pair of balls with very little deflection of the elastomeric material itself. As a result, a close angular relationship is maintained between the input and output shafts and there is very little backlash in response to torque reversals.

The utilization of the bearing material 56 causes the balls to rotate upon that surface rather than in the arm-portion sockets in response to the tilting of the axis of one shaft relative to the other. This is advantageous and in fact the balls may be glued or otherwise secured in the arm-portion sockets if desired. While the projecting elements are preferably in the form of balls, they can be, less desirably, formed as integral parts of the arm portions.

If the applied torque is sufficient to produce a significant deflection of the elastomeric member 54, the balls, or some of them, may engage the walls of the apertures in the cage 44. If this occurs frequently in any given usage of the units, it is desirable to harden the cage to minimize wear. If desired, the ball-to-cage engagement may be employed as the primary torque-transmitting means in a given use of the unit, with the elastomeric material being employed primarily (or exclusively) as a resilient biasing and centering means and secondarily (or not at all) as a transmitter of torque at lower torque levels.

In the preferred arrangement, the sizes and relationships of the parts are selected so that the balls are centered within the wall thickness of cage 44, as is best illustrated in FIG. 6. Under torque overload conditions it is possible for some of the balls to tend to pop out of the sockets in cage 44. Against this contingency, it is wise to maintain a relatively small clearance between the arm portions, such as arm portion 20, and the outer surface of the cage 44. If the balls tend to lift out, this clearance will close and forces will be developed to tend to clamp the balls in their sockets in the cage.

Units constructed in accordance with the foregoing teachings have proved to have an extremely smooth operating feel and a very small degree of backlash. The construction lends itself to a large range of sizes. For example, one constructed unit of the configuration illustrated in FIG. 1 was constructed with hardened steel balls one-eighth of an inch in diameter.

It is theorized that one factor in the improved operation of the described unit is a result of hysteresis of the rubber. It appears that if a given preloading force is applied to the rubber or like material during assembly, either by compressing an oversized piece into the cage or by the compressing action of the balls, or both, the outward force which the material thereafter exerts on the balls is less. Thus, the elastomeric material acts as a resilient member but, unlike a spring, seems to exert a return force smaller than the initially applied deflecting force.

In the modification of FIG. 7, the coupling element, which couples torque from one pair of balls (or projecting elements) such as 34' and 36' to the other pair, such as 38' and 40' comprises as elastomeric element 54' and a cage 44' which also serves or may serve the bearing function of sleeve 56 in the first embodiment. In the FIG. 7 arrangement, cage 44' is formed of a relatively rigid plastic such as Delrin which is illustrated to be formed to a square tubular cross section with indentation formed thereon to constitute the sockets for the balls. The elastomeric member 54' is placed therewithin and is compressed between the balls, acting through the plastic cage. The degree of deformation of the elastomeric material in response to this compression may cause the cross section of that material to occupy the full cross section of the cage or, as shown, the elastomeric material may occupy less than the full available space.

The arrangement of FIG. 8 does, or may, dispense with the advantages of the elastomeric member but can function acceptably in some uses. In that joint, the coupling member 18" comprises a block 60 of solid material such as steel (which may be hardened). It may be, for example, approximately cubical. Cross apertures 62 and 64 are formed, on mutually perpendicular axes, through block 60, constituting sockets for the balls. Those axes may, as shown, but need not, intersect. Balls or projecting elements 34" and 36" are bonded, as by gluing, to arm portions 20" and 22" (which may have spherically shaped sockets) and project into aperture 62. Correspondingly, balls 38" and 40" are secured to arm portions 30" and 32" and project into aperture 64. While each yoke-ball combination tends to be acceptably operationally self centering in block 60, resilient means may be provided in apertures 62 and 64 to establish a self centering force and to improve the smoothness of operation if desired. For example, elastomeric blocks may be press fitted within the apertures to engage each of the balls and to exert equalizing forces thereon. Those elastomeric blocks may be coated or faced with bearing material, as in the first embodiment, and the apertures adjacent the sides of the balls may be similarly covered with bearing material if desired. To facilitate engagement between the elastomeric material and the walls of the sockets, block 60 may be made larger than illustrated in relation to the size of the balls.

If desired, the balls may be bonded or otherwise secured in the sockets, with rotation occurring between the balls and their respective arm portions. It will also be appreciated that the sockets in the coupling member 60 may be indentations in the surface thereof, with each ball being free to rotate relative to the coupling element or to its respective arm portion, or relative to both.

In the arrangement of FIG. 2, the universal joint is illustrated as interconnecting a flexible shaft 12 and a solid shaft 16, with shaft 16 being drilled a short distance along its longitudinal axis to establish a measure of resiliency to the shaft, to facilitate assembly of the clamping ring, and to insure that the two yoke halves can come into abutment during assembly. If desired, one or more set screws may be used in association with that shaft. The modification of FIG. 9 (which is a cross sectional view corresponding to a section along 3—3, in FIG. 2, of a modified construction) illustrates a suitable association with one of the torque transmission members with a solid shaft. In this modification, the yoke halves 24' and 26' are cast with corresponding half keyways, such as keyway portion 60, along their parting lines so as to define a pair of diametrically opposed keyways on assembly. Keys 62 and 64 engage those keyways and corresponding keyways in the solid shaft 12' to prevent relative rotation between shaft 12' and the torque transmitting member. In addition, relative longitudinal motion between those parts may be prevented by provision of one or more set screws such as set screw 66.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A universal joint comprising a pair of torque transmitting members, two pairs of torque transmitting elements associated in torque transmitting relation with individual ones of said torque transmitting members, a cage having two pairs of diametrically opposed sockets, each socket accepting one of said torque transmitting elements, and resilient means within said cage for continuously exerting a force in a direction tending to move each of said torque transmitting elements in a direction towards its individual torque transmitting member.

2. A universal joint comprising a pair of torque transmitting members, two pairs of balls associated in torque transmitting relation with individual ones of said torque transmitting members, a cage having two pairs of diametrically opposed sockets, each socket accepting one of said balls, and resilient means within said cage for continuously exerting a force in a direction tending to move each of said balls in a direction towards its individual torque transmitting member.

3. The combination of claim 2 in which said balls are integral with their associated torque transmitting members.

4. The combination of claim 2 in which each of said torque transmitting members is provided with two sockets accepting individual ones of said balls.

5. In a universal joint, an elastomeric member, caging means having an aperture in the side thereof and surrounding and peripherally engaging said member and effectively preventing radial expansion of said member, and means including a ball in said aperture for exerting compressive forces on said member.

6. In a universal joint, the combination of relatively rigid hollow sleeve means having an aperture therein, an elastomeric member disposed within and engaging said sleeve over at least a major portion of the periphery of said member and having a surface portion adjacent said aperture, a ball in said aperture and abutting said surface portion, means exerting a force on said ball embedding a portion thereof in said surface portion.

7. The combination of claim 2, in which said cage is a relatively rigid hollow pastic member with indentations in the surface thereof constituting said sockets and in which said resilient means comprises an elastomeric member confined within said cage and maintained under compression by the balls.

8. The combination of claim 2 in which said cage is a relatively rigid hollow member having apertures extending through the surface thereof constituting said sockets, and in which said resilient means comprises an elastomeric member confined within said cage and a low-friction material disposed between said elastomeric member and said balls adjacent said apertures.

9. A universal joint comprising a pair of torque transmitting yokes each having a pair of substantially parallel arm portions, a relatively rigid tubular member having one pair of aligned apertures extending transversely through the wall thereof and another pair of aligned apertures extending transversely through the wall thereof and disposed in a line substantially perpendicular to the line of said one pair of apertures, a ball disposed in each of said apertures and engaging an individual one of said arm portions, and resilient means within said tubular member compressed by said balls.

10. The combination of claim 9 in which said resilient means comprises an elastomeric member disposed within said tubular member and radially confined thereby.

11. The combination of claim 9 in which said resilient means comprises an elastomeric member disposed within said tubular member and radially confined thereby and a low-friction material disposed between said elastomeric member and said balls adjacent said apertures.

12. The combination of claim 11 in which said arm portions are provided with sockets to accept the individual ones of said balls.

13. The combination of claim 11 in which said balls are secured to said arm portions.

14. A universal joint comprising a pair of torque transmitting yokes each having a pair of substantially parallel arm portions, a relatively rigid tubular member having one pair of aligned apertures extending transversely through the wall thereof and another pair of aligned apertures extending transversely through the wall thereof and disposed in a line substantially perpendicular to the line of said one pair of apertures, a ball having a diameter substantially greater than the wall thickness of said tubular member disposed in each of said apertures and engaging an individual one of said arm portions, and resilient means within said tubular member compressed by said balls.

15. A universal joint comprising a pair of torque transmitting yokes each having a pair of substantially parallel arm portions, a relatively rigid tubular member having one pair of aligned apertures extending transversely through the wall thereof and another pair of aligned apertures extending transversely through the wall thereof and disposed in a line substantially perpendicular to the line of said one pair of apertures, a ball having a diameter substantially greater than the wall thickness of said tubular member and smaller than the diameter of the aperture disposed in each of said apertures and engaging an individual one of said arm portions, and resilient means within said tubular member compressed by said balls.

16. A universal joint comprising a pair of torque transmitting members each comprising two spaced arms and a projecting element projecting from each arm toward but spaced from the other arm, and coupling means interconnecting said torque transmitting members comprising means including a radially confined elastomeric material radially compressed by said projecting elements, said coupling means including a sleeve partially encasing said elastomeric material and engaging said projecting elements and disposed between said projecting elements and said elastomeric material.

17. The combination of claim 16 in which said projecting elements press into said means including said elastomeric material and exert compressive forces on said material, in which said sleeve is substantially more rigid than said elastomeric material and cages said elastomeric material radially and limits the extent of the radial displacement of said elastomeric material in response to the application of said compressive forces.

18. In a universal joint for communicating torque from one shaft to another, a torque transmitting member comprising a yoke having first and second effectively identical portions, each of said portions comprising a projecting arm section and a body section, each of said body sections being generally semi-annular in cross section, the inner surface of each of said body sections comprising a pair of diametrically aligned flat portions separated by a generally half circular cylindrical shaft accepting portion, the outer surface of each of said body sections having a cross section which lies within the confines of a circle defined by three points on that surface and having a surface portion inwardly spaced from said circle, and sleeve means having an internal diameter substantially equal to the diameter of said circle press fitted over said outer surfaces of said body sections and engaging said outer surfaces over the major portions thereof and forcing corresponding ones of said flat portions on said first and second yoke portions towards engagement.

References Cited by the Examiner

UNITED STATES PATENTS

| | | | |
|---|---|---|---|
| 1,093,822 | 4/1914 | Blum | 64—17 |
| 1,705,731 | 3/1929 | Hufferd | 64—17 |
| 1,913,045 | 6/1933 | Wood | 64—17 |
| 1,947,959 | 2/1934 | Williston | 64—17 |
| 2,208,547 | 7/1940 | Murphy | 64—17 |
| 2,545,646 | 3/1951 | Blinkman | 64—17 |
| 2,587,819 | 3/1952 | Camerino | 64—14 |
| 2,601,012 | 6/1952 | Wolff | 64—7 |
| 2,879,651 | 3/1959 | Leto et al. | 64—17 |
| 3,107,506 | 10/1963 | Klomp | 64—17 |

FOREIGN PATENTS

| | | |
|---|---|---|
| 1,040,644 | 5/1953 | France. |
| 1,299,989 | 6/1962 | France. |
| 1,352,948 | 1/1964 | France. |

FRED C. MATTERN, Jr., *Primary Examiner.*

HALL C. COE, *Examiner.*